Patented Apr. 14, 1925.

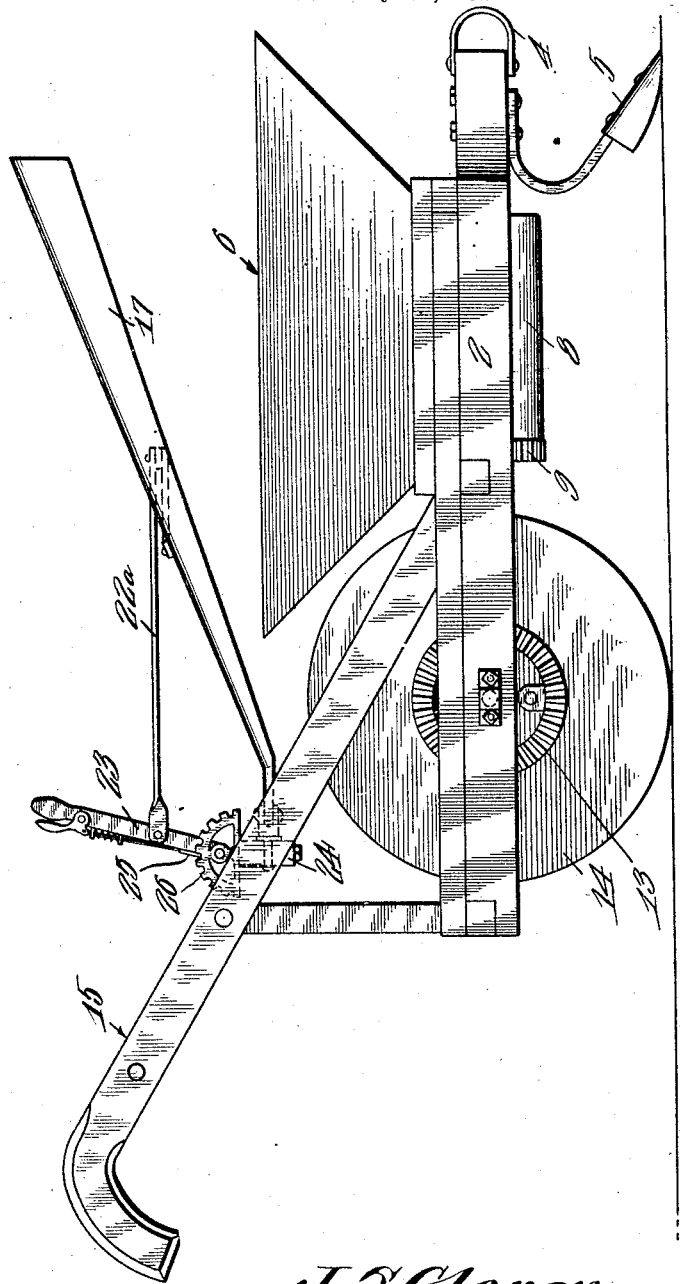

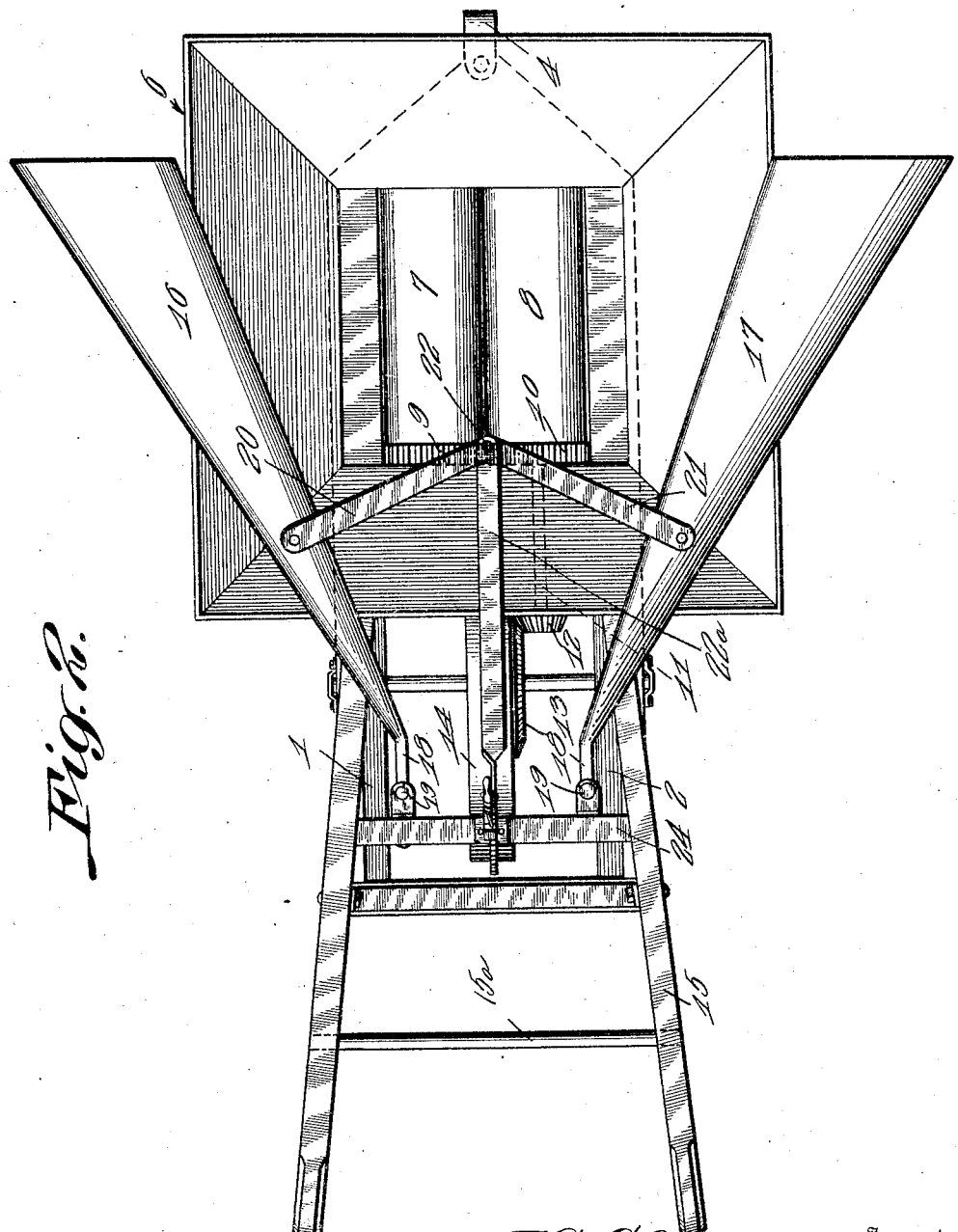

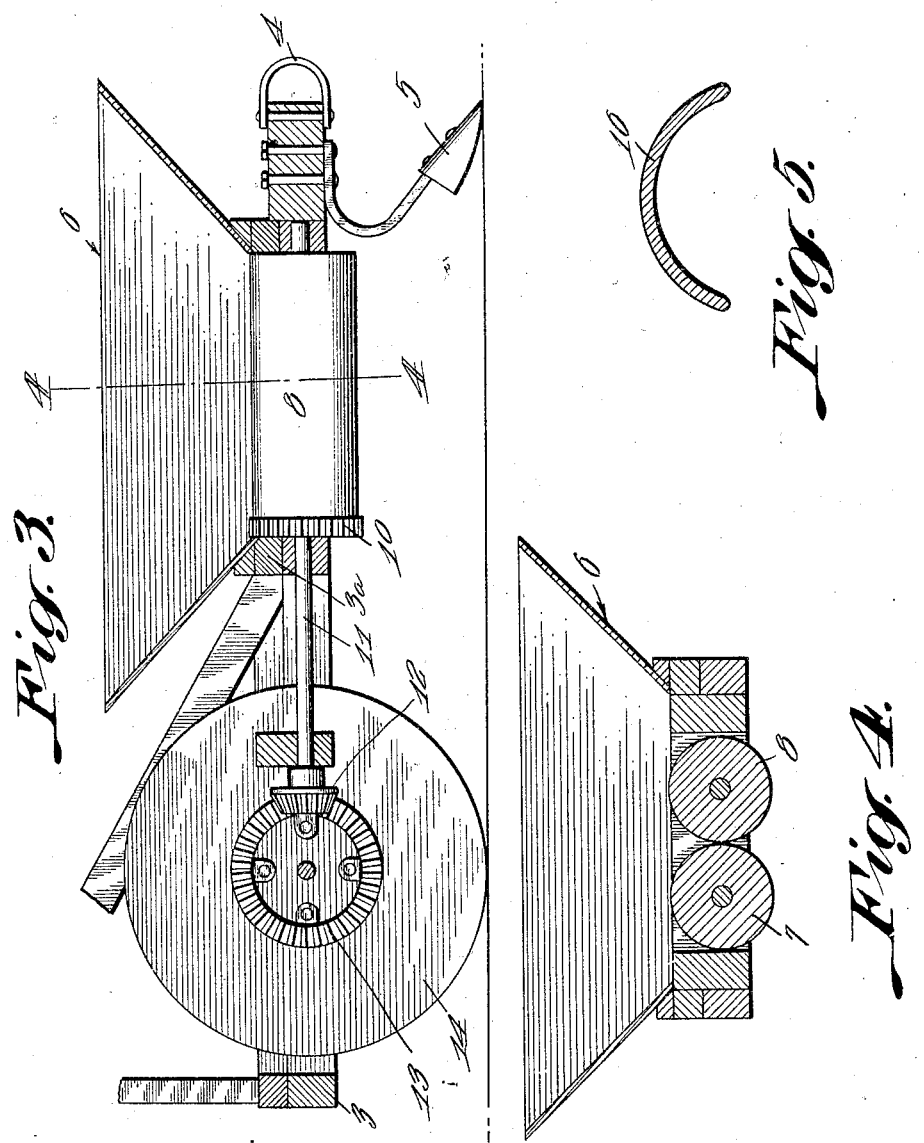

1,533,851

UNITED STATES PATENT OFFICE.

JAMES SULLIVAN GLOVER, OF ELBRIDGE, TENNESSEE.

BOLL-WEEVIL DESTROYER.

Application filed July 23, 1923. Serial No. 653,251.

*To all whom it may concern:*

Be it known that I, JAMES S. GLOVER, a citizen of the United States, residing at Elbridge, in the county of Obion and State of Tennessee, have invented a new and useful Boll-Weevil Destroyer, of which the following is a specification.

This invention relates to insect destroyers and more particularly to boll weevil exterminators.

The object of the invention is to provide a simple, cheaply constructed apparatus of this character which will gather the insects and the punctured squares in which the eggs are laid from plants being cultivated, crush them and drop them onto the ground thereby utilizing them as fertilizer.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of an apparatus constructed in accordance with this invention.

Fig. 2 is a top plan view thereof.

Fig. 3 is a longitudinal section.

Fig. 4 is a transverse section taken through the hopper and crushing rolls on the line 4—4 of Fig. 3; and Fig. 5 is a transverse section through one of the wings.

In the embodiment illustrated a supporting frame is shown composed of laterally spaced side bars 1 and 2 connected at their rear by cross bar 3 and intermediate their ends by a similar bar 3ª the front end thereof being equipped with a clevis 4 below which at the rear is mounted a plow or shovel 5.

A hopper 6 is mounted on the frame and the side walls thereof extend beyond the opposite sides of the frame and which is designed to receive the insects gathered in by the wings 16 and 17, disposed thereover and presently to be described in detail. The hopper 6 has an open bottom and arranged therein are a pair of longitudinally disposed crushing rolls 7 and 8 composed of any suitable material, preferably of rubber, and which are equipped at one end with intermeshing gears 9 and 10 to provide for the simultaneous turning of the rolls by means to be described.

A shaft 11 extends longitudinally rearward from the crushing roll 8 and is provided at its rear end with a beveled gear 12 which meshes with a crown gear 13 carried by a supporting wheel 14 which is mounted to rotate in the frame at the rear of the hopper so that when the machine is passed over the ground the turning of wheel 14 will operate through the gears 12 and 13 to rotate the crushing rolls 7 and 8 toward each other. The turning of these rolls will operate to feed the insects and the punctured squares which fall into the hopper down between the rolls thereby crushing them and passing them out onto the ground where they will operate to fertilize the land.

Handles 15 such as are ordinarily used on plows and the like project rearwardly from the supporting frame of the machine and are connected by the usual rod 15ª. A pair of insect collecting wings 16 and 17 are pivotally mounted on the handles 15 and diverge toward the front end of the hopper. These wings are arcuate or semi-circular in cross section as shown in Fig. 5 and taper toward their rear ends where they merge into attaching arms 18 pivotally mounted on the handles at 19. This pivotal mounting of the wings adapts them to be moved laterally toward and away from each other to position them properly for engaging the plants on opposite sides of the hopper for gathering in the insects which are deposited in the hopper 6. The tapering of these wings toward their inner ends prevents lodgment of the boll weevil or other insects and provides ample space for the cotton plants to pull through and prevents breaking the limbs of the plants and the pulling off of the bolls. Links 20 and 21 are pivotally connected at one end with the wings intermediate their ends and with each other as shown at 22. A link or bar 22ª is also pivotally connected with the connected ends of the links 20 and 21 as shown clearly in Fig. 2 and extends rearwardly and is connected with a lever 23 fulcrumed on a cross bar 24 which connects the lower ends of the handles and on which the wings are pivoted. A toothed rack 26 is fixedly mounted on the cross bar 24 and is adapted to be engaged by a spring pressed dog 25 carried by the lever 23 for locking the lever in adjusted position. This lever is intended to control the position of the wings 16 and 17 and to lock them in adjusted position, it being obvious that when the lever is drawn rearwardly the links 20 and 21 will be straightened out and thus force the wings 16 and 17 outwardly while the forward movement of the lever will operate to move the links forwardly as shown in Fig. 2 and cause the wings 16 and 17 to move inwardly toward each other.

From the above description it will be obvious that this machine is extremely simple in construction being composed of a minimum number of parts having no springs or other elements which will be easily broken or rendered inoperative.

In the use of this machine any suitable draft means may be connected with the clevis 4, either a horse or tractor. When the machine is moved forwardly the shovel 5 will cultivate the ground while the rotation of wheel 14 will cause the crushing rolls to turn toward each other in the manner above described. The wings 16 and 17 having previously been poperly positioned in relation to the plants to be cultivated will engage the plants of adjacent rows and gather the insects thereon and the punctured squares into the hopper 6 which will feed them down onto the crushing rolls where they will be destroyed and passed on between the rolls onto the ground beneath. The concave faces of the wings are positioned downward so that insects which may lodge on the wings can not readily crawl over the tops of the wings and escape.

Various changes in the form, shape, proportion and other minor details of construction may be made without departing from the principle or sacrificing any of the advantages of the claimed invention.

I claim:

1. In an apparatus of the class described, a frame, a supporting wheel mounted to rotate thereon, a hopper mounted on said frame with crushing rolls in the bottom thereof, connections between said rolls and wheel whereby the turning of the latter will actuate the former, and wings mounted over said hopper to direct insects into the hopper, said wings being concavo-convex in cross section with the concave faces turned down to prevent insects lodging thereon from crawling up over the wings and escaping.

2. In an apparatus of the class described, a frame, a supporting wheel mounted to rotate thereon, a hopper mounted on said frame with crushing rolls in the bottom thereof, connections between said rolls and wheel whereby the turning of the latter will actuate the former, wings mounted over said hopper to direct insects into the hopper, and means for adjusting said wings toward and away from each other and locking them in adjusted position, said wings tapering toward their inner ends.

3. In an apparatus of the class described, a frame, a supporting wheel mounted to rotate thereon, a hopper mounted on said frame with crushing rolls in the bottom thereof, connections between said rolls and wheel whereby the turning of the latter will actuate the former, wings mounted over said hopper to direct insects into the hopper, and cooperating links and levers connected to move said wings toward and away from each other and to lock them in adjusted position.

4. In an apparatus of the class described, a frame, a supporting wheel mounted to rotate thereon, a hopper mounted on said frame with crushing rolls in the bottom thereof, connections between said rolls and wheel whereby the turning of the latter will actuate the former, wings mounted over said hopper to direct insects into the hopper, links pivotally connected at one end with said wings and at the other end with each other, a bar pivotally connected with the connected end of the links, a lever connected with the bar and adapted to be shifted to move the wings toward and away from each other, and means for holding the wings in adjusted position.

In testimony that I claim the foregoing as my own, I have hereto affixed my signature in the presence of two witnesses.

JAMES SULLIVAN GLOVER.

Witnesses:
 JIM HUEY,
 GUY CALL.